United States Patent [19]

Ando et al.

[11] Patent Number: 5,526,729
[45] Date of Patent: Jun. 18, 1996

[54] BOOSTER OF GASEOUS PRESSURE TYPE

[75] Inventors: Hiromi Ando; Nobumaro Osaka, both of Yamanashi-ken; Yasuhiko Amari, Kofu, all of Japan

[73] Assignee: Tokico Ltd., Kanagawa-ken, Japan

[21] Appl. No.: 164,051

[22] Filed: Dec. 8, 1993

[30] Foreign Application Priority Data

Dec. 11, 1992 [JP] Japan ............................. 4-332035
Mar. 8, 1993 [JP] Japan ............................. 5-046822

[51] Int. Cl.⁶ .................................................. F15B 13/04
[52] U.S. Cl. ............................. 91/32; 91/376 R; 91/379
[58] Field of Search .......................... 91/5, 32, 369.1, 91/369.2, 369.3, 369.4, 376 R, 379

[56] References Cited

U.S. PATENT DOCUMENTS

| | | | |
|---|---|---|---|
| 3,295,419 | 1/1967 | Vielmo et al. | 91/376 R |
| 3,780,620 | 12/1973 | Garnder | 91/376 R |
| 4,116,218 | 9/1978 | Acre et al. | 91/376 R |
| 4,800,799 | 1/1989 | Nishii | 91/376 R |
| 5,005,465 | 4/1991 | Boehm et al. | 91/369.1 |

FOREIGN PATENT DOCUMENTS

| | | |
|---|---|---|
| 1230324 | 12/1966 | Germany . |
| 1655969 | 10/1971 | Germany . |
| 2755488 | 1/1979 | Germany . |
| 59-134047 | 8/1984 | Japan . |
| 258851 | 11/1987 | Japan ................ 91/369.1 |

*Primary Examiner*—F. Daniel Lopez
*Attorney, Agent, or Firm*—Biebel & French

[57] ABSTRACT

The present invention provides a booster of the gaseous pressure type. The booster of the gaseous pressure type comprises: a power piston dividing the inside of a shell between a constant pressure chamber the inside of which is maintained in an approximately constant pressure, and a variable pressure chamber into which an operation gas can be introduced, wherein the power piston comprises a valve body projecting to the outside of the shell and a movable partition means for dividing the inside of the shell, with the inner periphery of the partition means fixed to the valve body; a valve for introducing the operation gas into the variable pressure chamber through a communication passage, according to a movement relative to the valve body of an input shaft which is connected to a brake pedal, and provided in the valve body; a cover for supporting the valve body and for forming an operation gas chamber which can store the operation gas, together with the shell, provided outside the portion of the valve body projecting from the shell; a gas source generating the operation gas; and a path for supplying the operation gas from the gas source to the operation gas chamber.

13 Claims, 4 Drawing Sheets

BOOSTER OF GASEOUS PRESSURE TYPE

BACKGROUND OF THE INVENTION

1. Industrial Field of the Invention

The present invention relates to a booster of the gaseous pressure type for outputting an assisted brake operating force in a vehicle or the like.

2. Related Art

Conventionally, a booster of the gaseous pressure type used in assisting a brake force by employing a large differential pressure between a negative pressure and a compressed gaseous pressure is known for use in a vehicle in which a motor can be employed to provide a negative pressure source and in which a powerful brake force is required. A booster of the gaseous pressure type for assisting a brake force by employing a differential pressure between the air pressure and a compressed gaseous pressure is also known for use as a booster of the gaseous pressure type used in a vehicle in which a motor cannot be employed as a negative pressure source, e.g., for a vehicle driven by a diesel engine, an electric motor or the like, and in which a powerful brake force is required. An example of such a booster of the gaseous pressure type is disclosed in Japanese Patent Application, First Publication, Laid-Open No. Hei 2-6260.

The booster of the gaseous pressure type comprises: a movable partition which divides an inside of a shell into a constant pressure chamber communicating with a negative pressure source, and a variable pressure chamber; a valve body which is provided on the movable partition and into which compressed air is introduced from the side opposite to the constant pressure chamber thereof; an output shaft and a return spring which are provided in the side of the constant pressure chamber of the valve body; an input shaft provided in the side opposite to the constant pressure chamber of the valve body; and a valve plunger having a side of the constant pressure chamber for receiving a reactive force from the output shaft and a side of the input shaft which has a sealed slidable portion on the valve body, wherein the valve plunger is slidably provided in the valve body and engaging the input shaft, and the side opposite to the constant pressure chamber of the plunger faces the compressed air. A first valve seat is provided on the valve plunger and a second valve seat is provided on the valve body. A valve member is provided on the valve plunger. A force to bring the valve member into contact with the first valve seat is applied to the valve member by a force-imparting member. The valve member cuts off communication between the variable pressure chamber and the compressed air source by seating in the first valve seat, and cuts off communication between the constant pressure chamber and the variable pressure chamber by seating in the second valve seat. A valve plunger return spring which applies a force to separate the valve member from the second valve seat, via the input shaft and the valve plunger engaging the input shaft, is provided between the input shaft and the valve body.

When no input force is applied from the brake pedal, the valve plunger is brought into contact with the valve member by the force applied by the force applying member to cut off the communication between the variable pressure chamber and the compressed air source, and the valve member is separated from the valve body by a force from the valve plunger return spring in order for the variable pressure chamber to communicate with the constant pressure chamber.

In the above-described state, a large compressed gas pressure from the compressed air source is exerted on a side of the valve plunger opposite to the constant pressure chamber. Therefore, the force imparted by the valve plunger return spring must be large in order to separate the valve member from the valve body in opposition to the compressed gaseous pressure. Consequently, there are problems in that the space required for providing the valve plunger return spring is large and the entirety of the booster is large.

SUMMARY OF THE INVENTION

The present invention was developed in view of the above circumstances.

Therefore, it is an object of the present invention to provide a small-sized booster of the gaseous pressure type which can reduce the force imparted by the valve plunger return spring, and which can be used both for a booster of the gaseous pressure type in which compressed air is introduced into the variable pressure chamber in order to generate a large differential pressure between a negative pressure and a compressed gas pressure, and for a booster of the gaseous pressure type in which a compressed air is introduced into the variable pressure chamber because a motor is not available for use as a negative pressure source.

In order to achieve the above objects of the present invention, the booster of the gaseous pressure type according to the present invention comprises: a power piston dividing the inside of a shell between a constant pressure chamber (the inside of which is maintained at an approximately constant pressure), and a variable pressure chamber into which an operation gas can be introduced, wherein the power piston comprises a valve body projecting to the outside of the shell and a movable partition means for dividing the inside of the shell, with the inner periphery of the partition means being fixed to the valve body; a valve for introducing the operation gas into the variable pressure chamber through a communication passage according to a movement relative to the valve body of an input shaft which is connected to a brake pedal, and which is provided in the valve body; a cover for supporting the valve body and for forming an operation gas chamber which can store the operation gas, together with the shell, provided outside the portion of the valve body projecting from the shell; a gas source for generating the operation gas; and a path for supplying the operation gas from the gas source to the operation gas chamber.

Preferably, the constant pressure chamber is communicated with an intake manifold or the air. Preferably, the valve body has an approximately cylindrical shape, the side opposite to the constant pressure chamber thereof faces the air, and the booster further comprises: an output shaft provided on the valve body in the side of the constant pressure chamber of the valve body; the input shaft is provided on the valve body at the side opposite to the constant pressure chamber; a return spring for imparting a force to the valve body and the movable partition in the direction of the input shaft; a valve plunger slidably provided in the valve body and engaging with the input shaft, facing the air, in the side of the plunger opposite to the constant pressure chamber, the portion of the plunger slidable on the valve body being sealed in the side of the input shaft, the valve plunger receiving a reactive force from the output shaft in the side of the constant pressure chamber; a passage having an end opened in a sliding range of the valve body on the valve plunger and the other end communicating a compressed air source; a communicating passage for communicating with the passage provided in the valve plunger; a first valve seat provided on the valve plunger; a second valve seat provided on the valve body; a valve member for cutting off the communication between the variable pressure chamber and the communicating passage by seating on the first valve seat, and for cutting off the communication between the constant pressure chamber and the variable pressure chamber by seating on the second valve seat; a member for imparting a force to the valve member to seat the valve member on the first valve seat; and a valve plunger return spring for imparting a force to the valve plunger to separate the valve plunger from the second valve seat.

In the booster of the gaseous pressure type of the present invention, since the valve plunger separates the valve member, which is seated on the first valve seat of the valve plunger, from the second valve seat provided on the valve body via the force of a valve plunger return spring, communication between the variable pressure chamber and the communicating passage provided in the valve plunger is cut off, and the constant pressure chamber communicating with the air or the negative pressure chamber is communicated with the variable pressure chamber when no input force is applied from the brake pedal. Therefore, the compressed gas is introduced into the communicating passage through the passage having an end opened in a sliding range of the valve body on the valve plunger and the other end communicating the compressed gas source, and the compressed gas is not introduced into the variable pressure chamber. Consequently, a differential pressure is not generated on the movable partition. Since a compressed gas is introduced in the communicating passage in the valve plunger, the compressed gas pressure does not wholly act as a force to push on the valve plunger, and therefore the air pressure acts on the side opposite to the constant pressure chamber. It is possible to reduce the force of the valve plunger acting in the direction of the constant pressure chamber, in comparison with the booster in which a compressed gas pressure wholly acts on the valve plunger in the side opposite to the constant pressure chamber. It is also possible to reduce the force of the valve plunger return spring for applying to the valve member a force in the direction opposite to the constant pressure chamber and for separating the valve member from the valve body. Therefore, it is possible to provide a small-sized booster of the gaseous pressure type which can be used both for a booster in which a compressed gas is introduced into the variable pressure chamber in order to generate a large differential pressure between the constant pressure chamber 15 and the variable pressure chamber 16, and which can be used for a booster in which a compressed gas is introduced into the variable pressure chamber because a motor is not available to be used as a negative pressure source.

Preferably, the valve for introducing the operation gas into the variable pressure chamber is provided in the middle of the communication passage for communicating the variable pressure chamber with the operation gas chamber, and is disposed between the input shaft and an output shaft, and is around the central axis of these shafts. According to the booster having such a construction, it is not necessary to radially extend the valve body. Therefore, it is possible to reduce the force which the valve body receives from the operation gas chamber, and to reduce the spring load of the return spring.

Preferably, a pressure sensor for detecting the pressure in the operation gas chamber is provided, and supply of the operation gas is controlled by a control part on the basis of a signal from the pressure sensor so that the pressure in the operation gas chamber is always maintained at an approximately predetermined value. According to the booster having such a construction, it is possible to always obtain an appropriate constant assisted brake force.

Preferably, the valve plunger comprises a large diameter portion provided in the input shaft side and a small diameter portion having a predetermined diameter smaller than that of the large diameter portion, wherein the diameter portions are slidably interfitted into the holes of the valve body, and an insertion hole communicating with the operation gas chamber is formed in the valve plunger in the vicinity of the boundary between the large and small diameter portions, the insertion hole being disposed perpendicularly to the axis of the valve plunger. According to the booster having such a construction, since the diameter $\phi D_1$ of the small diameter portion of the valve plunger is smaller than the diameter $\phi D_2$ of the large diameter portion, and therefore $\phi D_1$ is less than $\phi D_2$, the load is consequently imposed on the valve plunger in the anti-output direction. Therefore, it is possible to further reduce the load of the valve plunger return spring.

Preferably, the constant pressure chamber is communicated to the intake manifold, and the booster comprises: a valve for introducing air into the variable pressure chamber via a movement, relative to the valve body, of an operating rod connected to a brake pedal provided in the valve body; and a switching valve which is opened to supply a compressed operation gas from the operation gas chamber into the variable pressure chamber when the length of the movement of the input shaft relative to the valve body in the output direction is larger than a predetermined value.

In the booster of the gaseous pressure type having such a construction, when a brake pedal of the vehicle is depressed in order to obtain an ordinary deceleration and the operating rod connected to the brake pedal is moved relative to the valve body in the output direction, the popper valve introduces air into the variable pressure chamber to generate a differential pressure on the power piston, and thus the booster assists an input to the operating rod and outputs it. When the brake pedal is strongly depressed by a large force in order to produce a sudden deceleration after a brake operation or non-brake-operation, and the length of the relative movement of the operating rod to the valve body in the output direction is larger than a predetermined value (for example, where the relative position of the operating rod is moved in the vicinity of a limiting position thereof) the switching valve opens to introduce a compressed gas from the compressed gas source generating the compressed gas into the variable pressure chamber through the passage. Consequently, a differential pressure can be generated on the power piston more rapidly than by introducing ordinary air.

When the brake pedal is depressed to a greater extent in order to obtain a larger deceleration after the pressure of the variable pressure chamber has become approximately equal to the atmospheric pressure, the length of the relative movement of the operating rod to the valve body in the output direction is larger than a predetermined value (for example, the relative position of the operating rod is moved into the vicinity of a limiting position thereof) and therefore the switching valve opens to introduce a compressed gas from the compressed gas source generating the compressed gas into the variable pressure chamber through the passage. Consequently, the pressure of the variable pressure chamber becomes higher than the atmospheric pressure and a larger differential pressure acts on the power piston.

Preferably, the switching valve cuts off the introduction of the air into the operation pressure chamber and supplies the compressed air into the operation pressure chamber through the path when the length of the movement of the input shaft relative to the valve body in the output direction is larger than a predetermined value.

Preferably, the booster of the gaseous pressure type according to the present invention comprises: a shell; a power piston comprising a valve body which has an end positioned in the shell and the other end projecting to the outside of the shell, and a movable partition means for dividing the inside of the shell into two chambers, with an inner periphery fixed to the valve body and an outer periphery fixed to the inner periphery of the shell; a passage formed in the valve body; a valve which opens and closes the passage formed in the valve body according to a movement of an operating rod connected to a brake pedal; an output rod which can move accompanying the movement of the power piston, in which an end thereof is provided in the inner end side of the valve body and the other end thereof passes through the shell; a compressed air source which is communicated with one of the two chambers in the shell through the passage in the valve body; and a negative pressure source which is communicated with the other of the two chambers; wherein the passage in the valve body comprises a first passage for communicating the air with one of the two chambers, a second passage for communicating the compressed air source with the one of the two chambers, and a third passage for communicating the one of the two chambers with the other thereof; and the valve for opening and closing the passage in the valve body comprises a first valve which closes the first passage and which opens or closes the third passage at a non-operating position, and which opens the first passage and closes the third passage when the operating rod is moved with respect to the valve body in a predetermined range, and a second valve which closes the third passage and opens the first passage at a non-operating position or when the operating rod is moved with respect to the valve body in the predetermined range, and which opens the second passage and closes the first passage when the movement length of the operating rod with respect to the valve body is larger than the maximum value in the predetermined range.

DETAILED DESCRIPTION OF THE INVENTION

Figure 1:
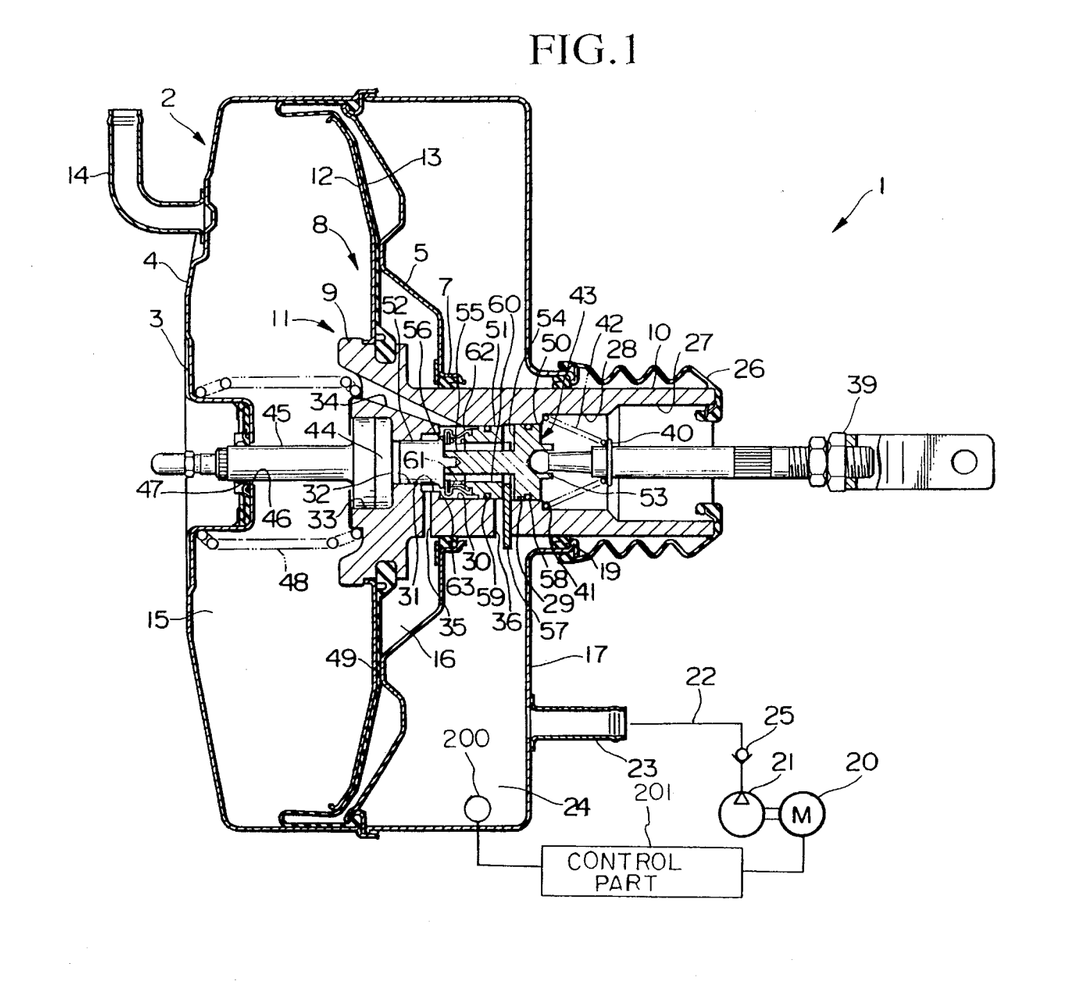
FIG. 1 is a sectional view showing the booster of the gaseous pressure type in a nonoperative state, according to the first embodiment of the present invention.

The booster of the gaseous pressure type according to the first embodiment of the present invention will be explained with reference to FIG. 1. In the following explanation, an "output direction" indicates the output direction of the booster of the gaseous pressure type (that is, towards the left of this Figure), and the "anti-output direction" indicates the direction opposite to the output of the booster of the gaseous pressure type (that is, towards the right of this Figure).

In this Figure, reference numeral 1 denotes a booster of the gaseous pressure type. The booster of the gaseous pressure type 1 has a shell 2. The shell 2 comprises a front shell 4 and a rear shell 5 interfitting airtightly into the front shell 4 and disposed on the anti-output side. A master cylinder (not shown) is attached to the outside of an end surface 3 of the front shell 4, on the output side. The rear shell S has an interfitting hole 6 formed on the anti-output side and a seal and supporting member 7 comprising an elastic material such as rubber disposed in the interfitting hole 6 of an end portion of the rear shell 5. A power piston 8 is slidably supported on the seal and supporting member 7.

The power piston 8 comprises a valve body 11 having an approximately cylindrical shape with a step, a plate 12 having a disc shape with a hole, and a partition member 13 comprising an elastic material such as a rubber. The valve body 11 comprises a flange portion 9 positioned in the shell 2, and a cylindrical small diameter portion 10 having a diameter slightly smaller than that of the flange portion 9. The inner periphery of the plate 12 is fixed to the flange portion 9 of the power piston 8, and the plate 12 extends in a radial direction towards the outside. The partition member 13 is provided on the plate 12 on the anti-output side. The inner periphery of the partition member 13 is airtightly supported on the flange portion 9, and the outer periphery of the partition member 13 is airtightly supported on the shell 2. The plate 12 and the partition member 13 form the movable partition in the embodiment of the present invention. Thus, the inside of the shell 2 is airtightly divided in a constant pressure chamber 15 which communicates with a negative pressure source (not shown) or the air through an external communicating pipe 14, disposed on the output side, and a variable pressure chamber 16 disposed on the anti-output side.

A cover 17 is provided outside the small cylindrical diameter portion 10 projecting from the rear shell 5. An end of the cover 17 disposed on the output side has the largest diameter, which is approximately equal to that of the rear shell 5, and is airtightly fixed to the rear shell 5. The cover 17 has a shape comprising two cylindrical portions, the diameters of which are different from each other. The cover 17 has a seal and supporting member 19 comprising an elastic material such as rubber at a periphery of an interfitting hole which is formed in an end portion of the cover 17 disposed on the anti-output side. The small cylindrical diameter portion 10 of the valve body 11 is slidably supported on the seal and supporting member 19.

On the cover 17, a communication pipe 23 which is connected to a pump 21 through an external pipe 22, is provided. The pump 21 is a compressed gas source which generates a compressed gas, e.g., a compressed air, by driving a motor 20. Thus, the space surrounded by the cover 17 and the rear shell 5 forms a operation gas chamber 24 into which a compressed gas may be filled. A check valve 25 for preventing back flow of the compressed gas in the direction of the pump 21 is provided in the middle of the external pipe 22.

A pressure sensor 200 is provided at a predetermined position in the operation gas chamber 24 or in the middle of the external pipe 22 between the operation gas chamber 24 and the check valve 25. For example, the drive of the motor 20 is controlled by a control part 201 using a signal from the pressure sensor which indicates a pressure in the operation gas chamber 24 so that the pressure in the operation gas chamber 24 is always a predetermined value higher than that of the air pressure. A dust boot 26 which covers the part of the valve body 11 projecting from the cover 17 is provided between the anti-output end of the valve body 11 and the anti-output end of the cover 17, in order to prevent adhesion of dust or the like to the outer peripheral surface of the projecting end portion of the valve body 11.

The inner peripheral portion of the valve body 11 is divided into a first hole portion 27 having a predetermined diameter disposed on the anti-output side, a second hole portion 28 having a predetermined diameter disposed adjacent to the first hole portion 27 on the output side, a third hole portion 29 having a predetermined diameter disposed adjacent to the second hole portion 28 on the output side, a fourth hole portion 30 having a predetermined diameter disposed adjacent to the third hole portion 29 on the output side, a fifth hole portion 31 having a predetermined diameter disposed adjacent to the fourth hole portion 30 on the output side, a sixth hole portion 32 having a predetermined diameter disposed adjacent to the fifth hole portion 31 on the output side, and a seventh hole portion 33 having a predetermined diameter disposed adjacent to the sixth hole portion 32 on the output side.

The valve body 11 is provided with a constant pressure passage 34 which has an end opened to a predetermined position of the fourth hole portion 30 on the side of the fifth hole portion 31 and the other end opened to the constant pressure chamber 15, a working pressure passage 35 disposed perpendicular to the axis of the valve body 11, which has an end opened to the fifth hole portion 31 and the other end opened to the variable pressure chamber 16, and a compressed gas passage (passage) 36 disposed perpendicular to the axis of the valve body 11, which has an end opened to the boundary portion between the third hole portion 29 and the fourth hole portion 30, and the other end opened to the operation gas chamber 24.

An input shaft 39 is inserted in the opening of the valve body 11. The input shaft 39 has a flange portion 40 at an intermediate predetermined position. A valve plunger return spring 42 which can give a predetermined force is provided between flange portion 40 and a step between the second and third hole portions 28 and 29 of the valve body 11. The input shaft 39 is connected to a brake pedal (not shown) and can move in the output direction by an input force to the brake pedal.

The top end of the input shaft 39 on the output side engages with the end of the valve plunger 43 in the anti-output side which is slidably interfitted into the third to sixth hole portions 29–32. An output shaft 45 is provided in the seventh hole 33 through a reaction disc 44 comprising an elastic material such as rubber in the output direction of the valve plunger 43. The output shaft side 45 of the valve plunger 43 is sealed by the reaction disc 44. The top end portion of the output shaft 45 projects from an insertion hole 46 provided in the front shell 4, and is sealed with a front seal 47. The output shaft 45 is constructed to output to a master cylinder (not shown) via the movement of the power piston 8 in the output direction. Between the front shell 4 and the power piston 8, a return spring 48 for imparting a predetermined force in the anti-output direction of the power piston 8 is provided. Movement of the power piston 8 in the anti-output direction is limited by the plate 12 contacting with a projecting portion 49 of the rear shell 5 via the partition member 13.

As described above, the valve plunger 43 is slidably inserted in the valve body 11. The valve plunger 43 comprises a large diameter portion 50 slidably interfitted into the third hole portion 29, a small diameter portion 51 having a predetermined diameter smaller than that of the large diameter portion 50, which is slidably interfitted into the fourth hole portion 30, and an interfitting portion 52 slidably interfitted into the sixth hole portion 32. An engaging portion 53 with which the input shaft 39 engages, is provided on the large diameter portion 50 on the anti-output side. An insertion hole 54 is formed in the valve plunger 43 at a predetermined position in the vicinity of the boundary between the large diameter portion 50 and the small diameter portion 51, and is disposed perpendicularly to the axis of the valve plunger 43. An annular groove portion 55 having a predetermined depth is formed in the valve plunger 43 at a predetermined position of the small diameter portion 51 on the output side. In addition, an annular projecting portion 56 which projects radially to a predetermined length, is formed on the interfitting portion 52 in the side of the annular groove portion 55.

An approximately "U" shaped stopper plate 57 is inserted into and engaged with the compressed gas passage 36 of the valve body 11 and the insertion hole 54 of the valve plunger 43. Seal members 58 and 59 comprising an elastic material such as rubber, are provided on the outside periphery of the valve plunger 43 on both sides of the insertion hole 54. These seal members 58 and 59 are for preventing leakage of the gas in the operation gas chamber 24 from the compressed gas passage 36, through a gap on the outside periphery of the valve plunger 43. The compressed gas passage 36 and the insertion hole 54 are always communicated with each other.

A plurality of communicating holes 60, each of which has an end opened at a predetermined position of the insertion hole 54 and the other end opened at a predetermined position of the inner side in the annular groove portion 55, are formed along the axis of the valve plunger 43. The communicating holes 60 constitute a communicating passage together with the insertion hole 54.

An elastically deformable annular valve member 62 is provided in the annular groove portion 55, and is given a force in the output direction by a spring (force applying member) 61. An end of the annular valve member 62 is airtightly interfitted into the outer periphery of the small diameter portion 51 in the side of the annular groove portion 55. When the annular valve member 62 is seated by the force of the spring 61 on the annular projecting portion 56 constituting the first valve seat on the anti-output side, the communication between the space in the annular groove portion 55 communicating with the communicating holes 60, the operating pressure passage 35, and the constant pressure passage 34 is cut off. When the annular valve member 62 is seated on the step 63 between the fourth and fifth hole portions 30 and 31 of the valve body 11 which constitute the second valve seat, the communication between the constant pressure passage 34 and the operating pressure passage 35 is cut off.

The function of the booster of the gaseous pressure type 1 having the above-described construction will be explained, as follows.

When the brake pedal (not shown) is not depressed, i.e., in a nonoperative state, no input force is applied from the input shaft 39 connected to the brake pedal, and consequently the power piston 8 is kept in contact with the projecting portion 49 via the force imparted by the return spring 48. The power piston 8 is therefore at the movement limiting position on the anti-output side. The valve plunger 43 is at the movement limiting position on the anti-output side (the state as shown in FIG. 1) when the movement thereof in the anti-output direction is limited by the stopper plate 57 and the valve body 11, and by the force imparted by the valve plunger return spring 42. In this state, the annular valve member 62 is seated, by the force of the spring 61, on the annular projecting portion 56 constituting the first valve seat, and is separated from the step 63 constituting the second valve seat. The communication between the space in the annular groove portion 55 communicating with the communicating holes 60, the operating pressure passage 35, and the constant pressure passage 34, is cut off, and therefore the operating pressure passage 35 and the constant pressure passage 34 are communicated with each other.

When the brake pedal is depressed, the input shaft 39 connected to the brake pedal and the valve plunger 43 are moved relative to the valve body 11 towards the output direction, against the force of the valve plunger return spring 42, within a predetermined range. Then, the valve member 62 becomes seated on the step 63 constituting the second valve seat in order to cut off the communication between the constant pressure passage 34 and the operating pressure passage 35.

Since the valve member 62 is seated on the step 63 constituting the second valve seat, and since the relative movement thereof to the valve body 11 in the output direction is limited, when the valve plunger 43 is further moved relative to the valve body 11 and towards the output direction, the valve member 62 is separated from the annular projecting portion 56 constituting the first valve seat, while the communication with the constant pressure passage 34 is cut off. Consequently, the operating pressure passage 35 and the compressed gas passage 36 are communicated with each other through the insertion hole 54 constituting the communicating passage and the communicating holes 60. Thereby, compressed gas in the operation gas chamber 24 is introduced into the variable pressure chamber 16, so that a differential pressure is generated between the constant pressure chamber 15 and the variable pressure chamber 16, i.e., between both sides of the plate 12 of the power piston 8. Consequently, the input force to the input shaft 39 is assisted and the assisted force is outputted to the master cylinder side (not shown) through the output shaft 45.

In the case where a negative pressure is introduced into the constant pressure chamber 15 from an intake manifold of the motor or the like (not shown), when compressed gas is introduced into the variable pressure chamber 16, a large differential pressure, based on the difference between the negative pressure and the air pressure, is generated on the plate 12 of the power piston 8. Therefore, it is possible to generate a larger assisted force on the power piston 8.

In the case in which the negative pressure from a motor cannot be introduced and in which the air is introduced into the constant pressure chamber 15, a differential pressure between the air pressure and the compressed gaseous pressure is generated on the plate 12 of the power piston 8, by controlling the pressure of the compressed gas in the compressed gas chamber 24 which is appropriately introduced into the variable pressure chamber 16. Therefore, it is possible to appropriately generate an assisted force on the power piston 8.

When the force from the depression of the brake pedal is reduced, the valve plunger 43 is moved relative to the valve body 11 towards the anti-output direction by the reactive force transmitted from the side of the output shaft 45 through the reaction disc 44, or the like. Then, the annular projecting portion 56 constituting the first valve seat is seated on the valve member 62, and the valve member 62 is separated from the step 63 constituting the second valve seat. The communication with the compressed gas passage 36 is consequently cut off, and the operating pressure passage 35 and the constant pressure passage 34 are communicated with each other. Thereby, the pressure in the variable pressure chamber 16 becomes equal to that of the constant pressure chamber 15, so that the power piston 8 returns to the initial position.

According to the booster of the gaseous pressure type 1 of the first embodiment of the present invention, since a compressed gas is introduced into the insertion hole 54 and the communicating holes 60 in the valve plunger 43, the compressed gas pressure does not act on the valve plunger 43; however, the compressed gas pressure does act on the side opposite to the constant pressure chamber 15, i.e., on the opening side of the valve body 11, in the nonoperative state. Since only the air pressure acts to the valve plunger 43 on the side opposite to the constant pressure chamber 15, it is possible to reduce the force in the output direction, in comparison with the booster in which a compressed gas pressure acts on the valve plunger 43 on the side opposite to the constant pressure chamber 15. It is also possible to reduce the force of the valve plunger return spring 42 for separating the valve member 62 from the step 63 of the valve body 11, which is counter to the force on the output direction. Therefore, it is possible to provide a small-sized booster of the gaseous pressure type which can be used both for a booster of the gaseous pressure type in which a compressed gas is introduced into the variable pressure chamber in order to generate a large differential pressure between the constant pressure chamber 15 and the variable pressure chamber 16, and for a booster of the gaseous pressure type in which a compressed gas is introduced into the variable pressure chamber because a motor is not available for use as a negative pressure source.

Particularly, in this embodiment, since the diameter $\phi D_1$ of the small diameter portion 51 of the valve plunger 43 is less than the diameter $\phi D_2$ of the large diameter portion 50, i.e. since $\phi D_1$ is less than $\phi D_2$, the load is imposed in the anti-output direction. Therefore, it is possible to further reduce the load of the valve plunger return spring 42. The diameter of the small diameter portion 51 may be the same as that of the large diameter portion 50.

In the case where negative pressure is introduced into the constant pressure chamber 15, the valve plunger 43 may be provided with a passage which has an end opened into the insertion hole 54 and the other end opened on the anti-output side, i.e., a side opened to the air and a check valve provided in the middle of the passage which opens when the pressure in the side of the insertion hole 54 is lower than the air pressure. It may provide a passage communicating the compressed gas chamber 24 with the air, and a check valve in the middle of the passage which opens when the pressure on the side of the compressed gas chamber 24 is lower than the air pressure. Thereby, even if the pump 21 or the motor 20 for driving the pump 21 is not functioning, it is possible to introduce air into the variable pressure chamber 16 and to obtain an ordinary assisted force.

The valve member in the side fixed to the valve plunger may be also fixed to the valve body. The booster of the gaseous pressure type according to the second embodiment of the present invention will be explained with reference to FIG. 2.

Figure 2:
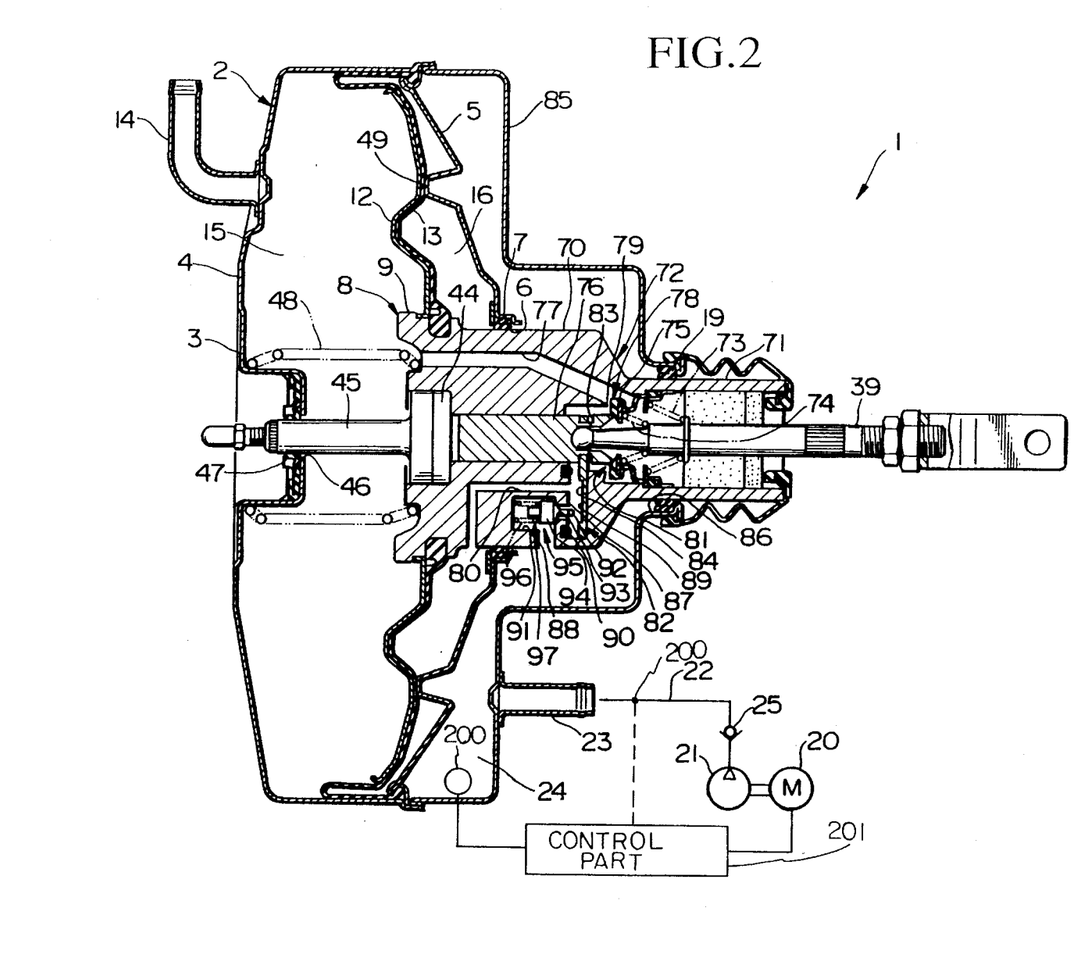
FIG. 2 is a sectional view showing the booster of the gaseous pressure type in a non-operation state, according to the second embodiment of the present invention.

In this Figure, numeral 1 denotes a booster of the gaseous pressure type. The booster of the gaseous pressure type 1 has a shell 2. The shell 2 comprises a front shell 4 and a rear shell S interfitting airtightly into the front shell 4 on the side of the anti-output. A master cylinder (not shown) is attached to the outside of an end surface 3 of the front shell 4 in the side of the output direction. The rear shell S has a seal and supporting member 7 comprising an elastic material, and is disposed on an end portion of the rear shell S with an interfitting hole 6 on the side of the anti-output. A power piston 8 is slidably supported on the seal and supporting member 7.

The power piston 8 comprises a valve body 72 having a cylindrical shape and a bottom with steps, a plate 12 having a disc shape with a hole, and a partition member 13 comprising an elastic material. The valve body 72 comprises: a flange portion 9 positioned in the shell 2; a large diameter portion 70 having a diameter slightly smaller than that of the flange portion 9, wherein the large diameter portion 70 is provided on the anti-output side of the flange portion 9 and is supported by the seal and supporting member 7; and a small diameter portion 71 having a predetermined small diameter. The inner periphery of the plate 12 is fixed to the flange portion 9 of the power piston 8, and the plate 12 extends in a radially outward direction. The partition member 13 is provided on the plate 12 on the anti-output side. The inner periphery of the partition member 13 is airtightly supported on the flange portion 9, and the outer periphery of the partition member 13 is airtightly supported on the shell 2. Thus, the inside of the shell 2 is airtightly divided in a constant pressure chamber 15 which communicates with a negative pressure source (not shown) through an external communicating pipe 14 and a variable pressure chamber 16 which is on the anti-output side.

The end on the output side of an operating rod (input shaft) 39, the other end of which is connected to a brake pedal (not shown), is inserted into an opening of the valve body 72 on the side of the small diameter portion 71. On the operating rod 39 on the output side, an elastic deformable poppet valve 75 is provided and disposed through springs 73 and 74. The top end of the operating rod 39 is engaged with a valve plunger 76 which is arranged on the central axis of the booster 1 in series with the popper valve 75. An output shaft 45 is provided on the central axis on the output side of the valve plunger 76 through a reaction disc 44 which comprises an elastic material having a diameter larger than that of the valve plunger 76. The top end portion of the output shaft 45 projects from an insertion hole 46 provided in the front shell 4, and is sealed with a front seal 47. The output shaft 45 is constructed to output to a master cylinder (not shown) via the movement of the power piston 8, in the output direction. Between the front shell 4 and the power piston 8, there is provided a return spring 48 for applying a predetermined force in the anti-output direction to the power piston 8. Movement of the power piston 8 in the anti-output direction is limited by the plate 12 contacting a projecting portion 49 of the rear shell 5 via the partition member 13.

A constant pressure passage 77 communicating with the constant pressure chamber 15 and a variable pressure passage 80 communicating with the variable pressure chamber 16 are formed in the valve body 72. The communication between the constant pressure passage 77 and the variable pressure passage 80 is cut off by the poppet valve 75 seated on a contact portion 79 which is disposed on a bottom portion of the valve body 72. Hereinafter, the valve composed of the poppet valve 75 and the contact portion 79 is simply called a constant pressure valve 78. The communication between the opening side of the valve body 72 and the variable pressure passage 80 is cut off by the poppet valve 75 seated on the end on the anti-output side of the valve plunger 76. The valve composed of the poppet valve 75 and the valve plunger 76 is termed an "atmosphere valve" 81.

When the power piston 8 is in a nonoperative state and in a movement limited position in the direction of the anti-output, the poppet valve 75 opens the constant pressure valve 78 and closes the atmosphere valve 81. That is, the poppet valve 75 communicates the variable pressure chamber 16 to the constant pressure chamber 15. When the operating rod 39 and the valve plunger 76 are moved relative to the valve body on the output side, via the operating rod 39 receiving an inputted force, the poppet valve 75 comes into contact with the contact portion 79 of the valve body 72, and thereby closes the constant pressure valve 78 in order to cut off the communication between the variable pressure chamber 16 and the constant pressure chamber 15. Thereafter, the poppet valve 75 is separated from the moving plunger 76 since movement of the poppet valve 75 is limited by the contact portion 79, and thereby opens the atmosphere valve 81 to communicate the variable pressure chamber 16 with the atmosphere. When the inputted force to the operating rod 39 is reduced, the valve plunger 76 and the operating rod 39 are moved in the anti-output direction and relative to the valve body 72, by a reactive force transmitted from the master cylinder side via the output shaft 45 and the reaction disc 44. Then, the end on the anti-output side of the valve plunger 76 comes into contact with the poppet valve 75 in order to close the atmosphere valve 81. Thereafter, the poppet valve 75 is separated from the contact portion 79 of the valve body 72 so that the constant pressure valve 78 is opened.

On the peripheral surface of the valve plunger 76, a groove 83 which engages with an end of a stopper plate 82 extending in a direction perpendicular to the center axis of the booster 1 is formed. The groove 83 has a predetermined width that is larger than that of the stopper plate 82. The other end of the stopper plate 82 is inserted into a groove 84 formed in the large diameter portion 70 of the valve body 72. The groove 84 has a predetermined width that is larger than that of the stopper plate 82. The range of the relative movement of the valve plunger 76 with respect to the valve body 72 is limited by the stopper plate 82. The groove 84 forms a part of the variable pressure passage 80.

In a second embodiment of the present invention, a cover 85 is provided outside the valve body 72 projecting from the rear shell 5. An end of the cover 85 in the output side has the largest diameter approximately equal to that of the rear shell S and is airtightly fixed to the rear shell 5. The cover 85 has a shape comprising three cylindrical portions which have diameters that are as small as the cylindrical portions which move in the anti-output direction. The cover 85 has a seal and supporting member 19 comprising an elastic material at a periphery of an interfitting hole 86 which is formed in an end portion of the cover 85 in the anti-output direction. The shell diameter portion 71 of the valve body 72 is slidably supported on the seal and supporting member 19. A communication pipe 23 which is connected to a pump 21, such as an air pump, via an external pipe 22, is provided on the cover 85. The pump 21 is a compressed gas source which generates a compressed gas by driving a motor 20. Thus, the space surrounded by the cover 85 and the rear shell 5 forms an operation gas chamber 24 into which a compressed gas may be filled. A check valve 25 for preventing back flow of the compressed gas in the direction of the pump 21 is provided in the middle of the external pipe 22.

A pressure sensor 200 is provided in the operation gas chamber 24 or in the middle of the external pipe 22, between the operation gas chamber 24 and the check valve 25. The drive of the motor 20 is controlled by a control part 201 using a signal from the pressure sensor so that the pressure in the operation gas chamber 24 is always a predetermined value higher than that of the air pressure.

On a side surface 87 of the valve body 72, on the output side of the groove 84, a first end opening which is connected to a portion of the variable pressure passage 80 on the side communicating with the variable pressure chamber 16, is provided. In the valve body 72 outside the first end opening, a second end opening forming a passage 88 to communicate the operation gas chamber 24 with the groove 84 is provided. A recess portion 89 opposed to a region including both the first and second end openings is formed on a side surface on the output side of the stopper plate 82. A seal ring 90 comprising an elastic material is interfitted into a recess of the side surface 87 of the valve body 72, and is disposed oppositely to a circumference of the recess portion 89 of the stopper plate 82.

A valve chamber 91 is provided in the middle of the passage 88. In the valve chamber 91, a switching valve 97 comprising a valve body 95 and a spring 96 for giving a force to the valve body 95, is provided. The valve body 95 comprises a projecting portion 92 which can project from the opening which is opposed to the recess portion 89 disposed in the side of the groove 84, and a valve portion 94 for closing the passage 88 by seating on a seat portion 93 in the anti-output direction of the valve chamber 91. The spring 96 gives the valve body 95 a force to seat it on the seat portion 93. In the switching valve 97, after the stopper plate 82 is moved in the vicinity of a movement limiting position in the output direction to the valve body 72 and comes into contact with the seal ring 90, the bottom surface of the recess portion 89 comes into contact with the projecting portion 92 of the valve body 95. Thereafter, the valve body 95 is moved in opposite direction to the force of the spring 96 by further movement of the stopper plate 82, and consequently the valve portion 94 is separated from the seat portion 93 in order to open the passage 88.

The relationship between an input force applied to the operating rod 39, and a reaction force received from the return spring 48 and the side of the master cylinder (not shown) are determined by the following conditions.

When a depressing force to obtain an ordinary deceleration is inputted to the brake pedal, the relative range of movement of the operating rod 39 with respect to the valve body 72 is set so that the stopper plate 82 does not come into contact with the seal ring 90 and the switching valve 97 does not open. When a large force is inputted to the brake pedal in order to obtain a sudden deceleration (when a spike braking is carried out), and when the brake pedal is depressed to obtain a further large deceleration, after the working pressure comes to the full load point, that is, the point at which the pressure in the variable pressure chamber becomes equal with the air pressure, the position of relative movement of the operating rod 39 with respect to the valve body 72 goes beyond the above predetermined range and moves into the vicinity of the movement limiting position so that the stopper plate 82 comes into contact with the seal ring 90 and the switching valve 97 is opened.

The booster of the gaseous pressure type 1 according to the embodiment comprises: a shell 2 and 5; a power piston 8 comprising a valve body 72 which has an end positioned in the shell 2 and 5 and the other end projecting to the outside of the shell 2 and 5, and a movable partition means 13 for dividing the inside of the shell 2 and 5 between two chambers 15 and 16, with an inner periphery fixed to the valve body 72 and an outer periphery fixed to the inner periphery of the shell 2; a passage means formed in the valve body 72; a valve means which opens and closes the passage means formed in the valve body 72 according to a movement of an operating rod 39 connected to a brake pedal; an output rod 45 which can move accompanying with the movement of the power piston 8, in which an end thereof is provided in the inner end side of the valve body 72 and the other end thereof passes through the shell 2; a compressed air source 21 which is communicated with one of the two chambers 15 and 16 in the shell through the passage means in the valve body 72; and a negative pressure source which is communicated with the other of the two chambers 15 and 16; wherein the passage means in the valve body 72 comprises a first passage 80 and 84 for communicating the air with one of the two chambers 15 and 16, a second passage 22-24, 88, 84 and 80 for communicating the compressed air source 21 with the one of the two chambers 15 and 16, and a third passage 80, 84 and 77 for communicating the one of the two chambers 15 and 16 with the other thereof; and the valve means for opening and closing the passage means in the valve body 72 comprises a first valve means 78 and 81 which closes the first passage 80 and 84 and which opens or closes the third passage 80, 84 and 77 at a non-operating position, and which opens the first passage 80 and 84 and closes the third passage 80, 84 and 77 when the operating rod is moved with respect to the valve body 72 in a predetermined range, and a second valve means 95 and 82 which closes the third passage 80, 84 and 77 and opens the first passage 80 and 84 at a non-operating position or when the operating rod 39 is moved with respect to the valve body 72 in the predetermined range, and which opens the second passage 22 24, 88, 84 and 80 and closes the first passage 80 and 84 when the movement length of the operating rod 39 with respect to the valve body 72 is larger than the maximum value in the predetermined range.

In the booster of the gaseous pressure type 1 having the above construction according to the first embodiment, when the brake pedal (not shown) is not depressed, i.e., in a nonoperative state, the constant pressure valve 78 is opened and the atmosphere valve 81 is closed. When the brake pedal is depressed in order to obtain an ordinary low deceleration, the operating rod 39 connected to the brake pedal and the valve plunger 76 are moved relative to the valve body 72 in the output direction and within the predetermined range. Then, the poppet valve 75 comes into contact with the contact portion 79 of the valve body 72, and thereby closes the constant pressure valve 78. Thereafter, the valve plunger 76 is separated from the poppet valve 75 to open the atmosphere valve 81. Consequently, the variable pressure passage 80 is communicated with the opening side of the valve body 72 to introduce the air into the variable pressure chamber 16. A differential pressure is generated between both sides of the plate 12 of the power piston 8, thus the input force applied to the operating rod 39 is assisted and the assisted force is outputted to the master cylinder side (not shown) via the output shaft 45.

When the brake pedal is greatly depressed by a large force, in order to obtain a sudden deceleration which cannot be ordinarily obtained during a brake-operation or non-brake-operation so that the length of the relative movement of the operating rod 39 and of the valve plunger 76 with respect to the valve body 72 goes in the output direction beyond the above predetermined range and comes into the vicinity of the movement limiting position, the stopper plate 82 comes into contact with the seal ring 90 to cut off the communication of the variable pressure passage 80, after the constant pressure valve 78 is already closed and the atmosphere valve 81 is opened. Then, the stopper plate 82 comes into contact with and pushes the projecting portion 92 of the valve body 95, so that the valve portion 94 is separated from the seat portion 93 in order to open the passage 88. Consequently, the operation gas chamber 24 is communicated with the variable pressure chamber 16 in order to introduce the compressed gas into the variable pressure chamber 16, through the passage 88, the space surrounded by the stopper plate 82 and the seal ring 90, and a part of the closed variable pressure passage 80 in the side of the variable pressure chamber 16. Thereby, a differential pressure is generated on the power piston 8 in a speed higher than in the case where ordinary air is produced. The passage 88 provided in the valve body 72, the space, and a part of the closed variable pressure passage 80 in the side of the variable pressure chamber 16, form a passage to connect the operation gas chamber 24 and the variable pressure chamber 16. This passage, the operation gas chamber 24, and the external pipe 22 form a passage to connect the pump 21 which is the compressed gas source, with the variable pressure chamber 16.

The pressure in the variable pressure chamber 16 becomes equal with the air pressure (the full load point) as a result of the brake operation for obtaining an ordinary deceleration, and when the brake pedal is further depressed to obtain a large deceleration, the operating rod 39 and the valve plunger 76 are moved into the vicinity of the movement limiting position beyond the above predetermined range, and in the output direction with respect to the valve body 72. Then, the stopper plate 82 engaging the valve plunger 76 comes into contact with and pushes the seal ring 90 in order to cut off the communication of the variable pressure passage 80, after the constant pressure valve 78 is closed and the atmosphere valve 81 is opened. The stopper plate 82 comes into contact with and pushes the projecting portion 92 of the valve body 95, so that the valve portion 94 is separated from the seat portion 93 in order to open the passage 88. Consequently, the operation gas chamber 24 is communicated with the variable pressure chamber 16 to introduce the compressed gas into the variable pressure chamber 16. Thereby, the pressure in the variable pressure chamber 16 rises above the air pressure to become approximately equal to that in the operation gas chamber 24, so that a larger differential pressure works on the power piston 8.

When the brake pedal continues to be depressed by a large force in order to obtain a sudden deceleration, so that the operating rod 39 and the valve plunger 76 are moved into the vicinity of the movement limiting position beyond the above predetermined range, in the output direction with respect to the valve body 72, and the stopper plate 82 keeps the switching valve 97 open in order to continue introducing the compressed gas into the variable pressure chamber 16. Thereby, the pressure in the variable pressure chamber 16 rises above the air pressure with a large rising rate to become approximately equal to that in the operation gas chamber 24.

In the booster of the gaseous pressure type 1 according to the second embodiment of the present invention, when an ordinary deceleration is required, the brake does not become oversensitive because the air is introduced into the variable pressure chamber 16 without opening the switching valve 97. When a sudden deceleration, which cannot be ordinarily obtained, is required, the switching valve 97 is opened to introduce the compressed gas into the variable pressure chamber 16, so that a differential pressure is generated on the power piston 8 at a speed higher than that of the introduction of the air. Therefore, the rising rate of the assisting force is large. The characteristics of the response with respect to the sudden deceleration of the booster is excellent.

When a further or larger deceleration is required after the pressure in the variable pressure chamber 16 becomes equal to the air pressure, the switching valve 97 is opened to introduce the compressed gas into the variable pressure chamber 16. Thereby, the pressure in the variable pressure chamber 16 rises above that of the air pressure, so that a larger differential pressure works on the power piston 8. Therefore, this embodiment provides a booster of the gaseous pressure type having a small size by which can be obtained a large assisting force, and which has a high upper limit in the assisting function.

Furthermore, since the large diameter portion 70 of the valve body 72 is supported by the shell 2, and the small diameter portion 71 thereof is supported by the cover 85, the valve body 72 can be stably supported.

Since the operation gas chamber 24 which is formed by a space surrounded by the cover 85 and the rear shell 5 is filled with a compressed gas, the passage communicating the operation gas chamber 24 with the variable pressure chamber 16 is provided in the valve body 72, and the switching valve 97 is provided in the middle of the passage, it is possible to reduce the length of a path for introducing the compressed gas into the variable pressure chamber 16 and to improve the characteristics of the response.

Figure 3:
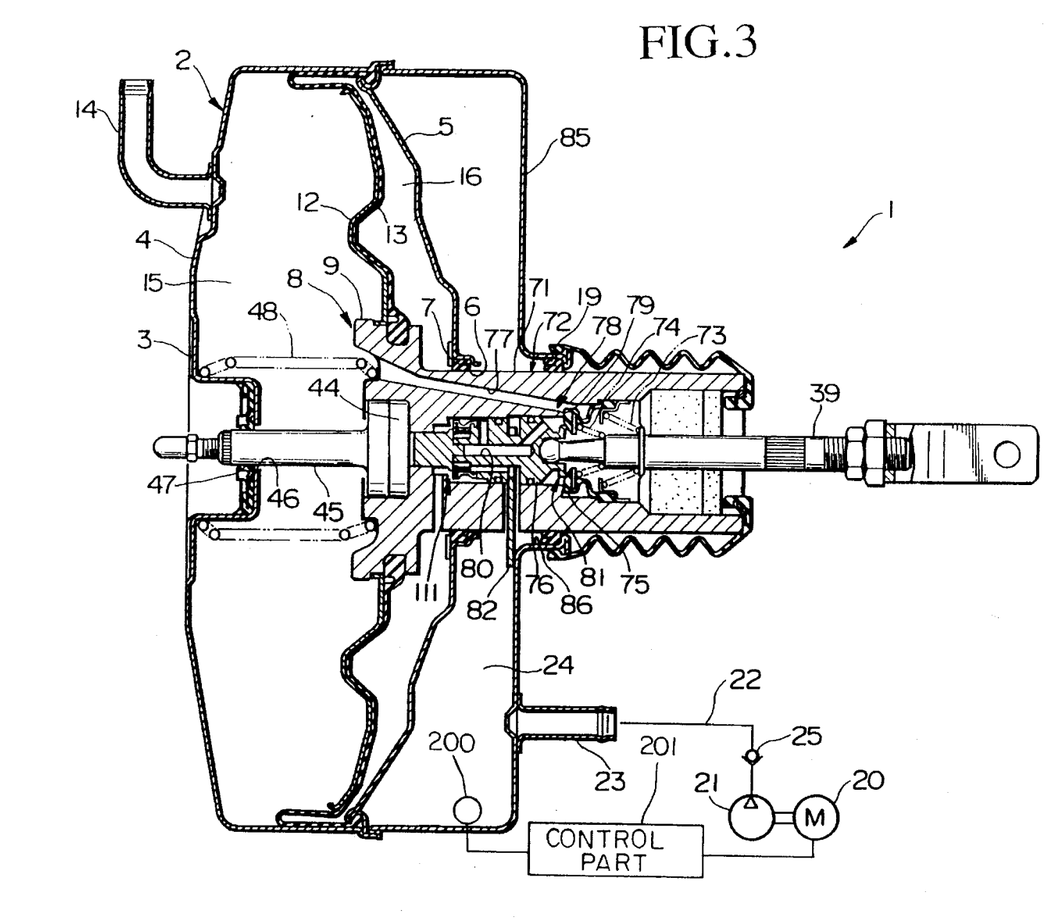
FIG. 3 is a sectional view showing the booster of the gaseous pressure type in a nonoperative state, according to the third embodiment of the present invention.

The booster of the gaseous pressure type according to a third embodiment of the present invention will be explained with reference to FIGS. 3 and 4. In these Figures, mainly the portion which is different from that in the second embodiment, will be explained. In the third embodiment, the same numerals are given to parts which have the same construction as those of the second embodiment in order to simplify the explanation thereof.

In the booster of the gaseous pressure type 1 of the second embodiment of the present invention, a valve body 72 of a power piston 8 comprises a flange portion 9 provided in the output side and a small diameter portion 71 provided in the anti-output side. The small diameter portion 71 is slidably supported on a seal and supporting member 7 of a rear shell 5.

The cover 85 has a shape comprising two cylindrical portions, the diameters of which are small as the position of the cylindrical portions are far from the shell 2 in the anti-output direction. The small diameter portion 71 of the valve body 72 is slidably supported on a seal and supporting member 19 which is provided on the end on the anti-output side of the cover 85.

Figure 4:
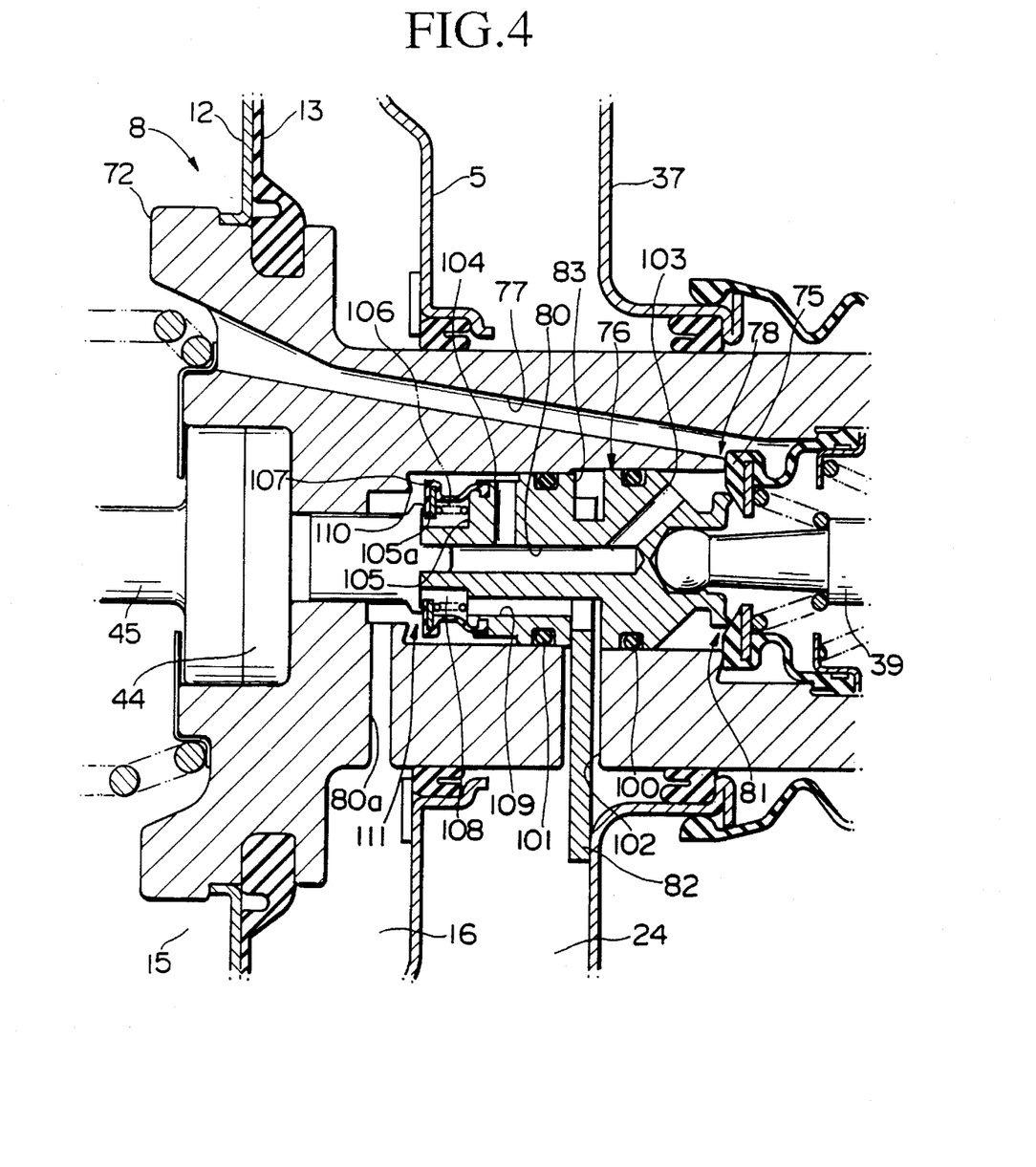
FIG. 4 is a partially enlarged sectional view showing a portion in the vicinity of the switching valve of the booster of the gaseous pressure type in a nonoperative state, according to the third embodiment of the present invention.

A stopper plate 82 having a shape of the letter "U" engages a peripheral surface of a valve plunger 76, as shown in FIG. 4. Seal members 100 and 101 are provided in both sides of a groove 83 engaging the stopper plate 82. These seal members, 100 and 101, are for preventing leakage air from a hole 102 in operation gas chamber 24, through a gap on the outside periphery of the valve plunger 76. The hole 102 is formed in the valve body 72 in order to insert the stopper plate 82 therein and to communicate with the operation gas chamber 24. A part of a variable pressure passage 80 which has openings 103 and 104 in both outer sides of the seal members, 100 and 101, is provided in the valve plunger 76. The opening 104 provided on the outer side is communicated with the variable pressure chamber 16 through a through hole 80a. The through hole 80a is provided in the bottom portion of the valve body 72 and forms a part of the variable pressure passage 80.

A depressed annular groove 105 is formed on the valve plunger 76 on the output side to the opening 104. An elastically deformable annular valve portion 107 which has a portion extending in a radial direction is provided. The annular valve portion 107 airtightly divides a space 108 in the annular groove 105 and the outside thereof by making contact with an annular projection 105a which is formed on an end surface on the output side of the annular groove 105 and which is assisted in the output direction by a spring 106. The space 108 provided inside the annular valve portion 107, the groove 83, and the hole 102 are communicated with one another through a passage 109 formed in the valve plunger 76. A regulating portion 110 projecting in an inner radial direction is provided on the valve body 72. The regulating portion 110 regulates movement of the annular valve portion 107 by contacting the valve portion 107 via movement of the valve plunger 76 when a brake pedal (not shown) is depressed by a large force in order to produce a sudden deceleration which cannot ordinarily be obtained. The above annular valve portion 107 and the spring 106 constitutes a switching valve 111 in the second embodiment.

Regulation with respect to the movement limit of the power piston 8 in the anti-output direction is carried out by the stopper plate 82 contacting the cover 85. In this state, both an atmosphere valve 81 and a constant pressure valve 78 are closed. When the brake pedal receives an input force, the atmosphere valve 81 is opened by the relative movement of the operating rod 39 in the output direction. When the inputted force to the brake pedal is reduced, the atmosphere valve 81 is closed by the relative movement of the operating rod 39 in the anti-output direction. Thereafter, the constant pressure valve 78 is opened, so that the pressure in the variable pressure chamber 16 becomes approximately equal to that in the constant pressure chamber 15. Consequently, the constant pressure valve 78 is closed by the balance of pressures in these chambers.

In the booster of the gaseous pressure type 1 of the third embodiment having the above construction, when the brake pedal (not shown) is not depressed, both the constant pressure valve 78 and the atmosphere valve 81 are closed. When the brake pedal is depressed in order to obtain an ordinary low deceleration, the operating rod 39 connected to the brake pedal and the valve plunger 76 are moved relatively in the output direction within the predetermined range. Then, the valve plunger 76 is separated from the poppet valve 75 in order to open the atmosphere valve 81. Consequently, the variable pressure passage 80 is communicated with the opening side of the valve body 72 in order to introduce the variable pressure chamber 16. A differential pressure is generated between both sides of the plate 12 of the power piston 8, and thus the input force to the operating rod 39 is assisted and the assisted force is outputted to the master cylinder side (not shown) via the output shaft 45.

When the brake pedal is greatly depressed, in order to produce a sudden deceleration which cannot be ordinarily produced during a brake-operation or non-brake-operation, a large force is imparted so that the length of the relative movement of the operating rod 39 and of the valve plunger 76 to the valve body 72 in the output direction goes beyond the above predetermined range and approaches the vicinity of the movement limiting position, and the annular valve portion 107 provided in the output side of the valve plunger 76 comes into contact with the regulating portion 110 of the valve body 72 in order to cut off the communication of the variable pressure passage 80. The annular valve portion 107 is retracted against the force of the spring 106 by a further movement of the valve plunger 76 and is separated from the annular projection 105a of the annular groove 105 to open the space 108. Consequently, the hole 102, the groove 83, the passage 109, the space 108, and a portion of the closed variable pressure passage 80 in the side of the variable pressure chamber 16 are communicated with one another, so that the compressed gas is introduced into the variable pressure chamber 16. The hole 102, the groove 83, the passage 109, the space 108, and the portion of the closed variable pressure passage 80 in the side of the variable pressure chamber 16, form a passage to connect the operation gas chamber 24 and the variable pressure chamber 16. This passage, the operation gas chamber 24, and an external pipe 22 form a passage to connect a pump 21 which is a compressed gas source and the variable pressure chamber 16.

After the pressure in the variable pressure chamber 16 becomes equal to the air pressure (the full load point) via a brake operation in order to obtain an ordinary deceleration, when the brake pedal is depressed to obtain a further and larger deceleration, the operating rod 39 and the valve plunger 76 are moved into the vicinity of the movement limiting position beyond the above predetermined range and in the output direction with respect to the valve body 72. The annular valve portion 107 provided in the output side of the valve plunger 76 then comes into contact with the regulating portion 110 of the valve body 72 in order to cut off the communication of the variable pressure passage 80. The annular valve portion 107 is then retracted against the force of the spring 106 by a further movement of the valve plunger 76 and is separated from the annular projection 105a of the annular groove 105 in order to open the space 108. Consequently, the operation gas chamber 24 and the variable pressure chamber 16 are communicated with each other so that the compressed gas is introduced into the variable pressure chamber 16.

When the brake pedal continues to be depressed by a large force in order to produce a sudden deceleration so that the operating rod 39 and the valve plunger 76 are moved into the vicinity of the movement limiting position beyond the above predetermined range, in the output direction with respect to the valve body 72, the switching valve 111 is maintained in an opened state in order to continue introducing the compressed gas into the variable pressure chamber 16. Thereby, the pressure in the variable pressure chamber 16 rapidly rises above the air pressure to become approximately equal to that of the operation gas chamber 24.

According to the booster of the gaseous pressure type 1 of the third embodiment of the present invention, it is possible to obtain not only the same effects as those of the first embodiment, but additionally, the following effects may also be obtained. Since the switching valve 111 is arranged on the output side of the valve plunger 76 in series with the valve plunger 76 which is arranged on the output side of the poppet valve 75 in series with the poppet valve 75, it is not necessary to radially extend the valve body 72. Therefore, it is possible to reduce the force which the valve body 72 receives from the operation gas chamber 24, and to reduce the spring load of the return spring 48.

In the second and third embodiments, when the operating rod 39 and the valve plunger 76 are moved into the vicinity of the movement limiting position in the output direction with respect to the valve body 72, the switching valves 97 and 111 are opened. However, the switching valves 97 and 111 may not necessarily be opened when the operating rod 39 and the valve plunger 76 are moved into the vicinity of the movement limiting position. These valves 97 and 111 may be opened when moved to any position beyond the predetermined range of the relative movement for obtaining the above-described ordinary low deceleration.

As described above, according to the booster of the gaseous pressure type of the present invention, since a compressed gas is introduced in the communicating passage in the valve plunger, the compressed gas pressure does not wholly act as a force to push on the valve plunger, and the air pressure acts on the side opposite to the constant pressure chamber. It is possible to reduce the force of the valve plunger acting in the direction of the constant pressure chamber, in comparison with the booster in which a compressed gas pressure wholly acts on the valve plunger on the side opposite to the constant pressure chamber. It is also possible to reduce the force of the valve plunger return spring for imparting to the valve member a force in the direction opposite to the constant pressure chamber, and for separating the valve member from the valve body. Therefore, it is possible to provide a small-sized booster of the gaseous pressure type which can be used both for a booster in which a compressed gas is introduced into the variable pressure chamber in order to generate a large differential pressure between the constant pressure chamber 15 and the variable pressure chamber 16, and for a booster in which a compressed gas is introduced into the variable pressure chamber because a motor cannot be used as a negative pressure source.

Since the valve body is supported not only by the shell but also by the cover, the valve body can be stably supported. Furthermore, since the operation gas chamber which is formed by a space surrounded by the cover and the rear shell can store a compressed gas, the passage communicating the operation gas chamber with the variable pressure chamber is provided in the valve body, and the switching valve is provided in the middle of the passage, it is possible to reduce the length of the path for introducing the compressed gas into the variable pressure chamber and to improve the characteristics of the response.

What is claimed is:

1. A booster of the gaseous pressure type comprising:
   a power piston which divides an inner cavity of a shell into a constant pressure chamber which is maintained at an approximately constant pressure and a variable pressure chamber into which an operation gas can be introduced, wherein the power piston comprises a movable partition, which divides the inner cavity of the shell, an outer periphery of which is fixed to an inner periphery of the shell and an inner periphery of which is fixed to a valve body one end of which projects out of the shell and another end at which is directed to the constant pressure chamber;
   a valve which is arranged in the valve body and is operated by an input shaft which is connected to a brake pedal so as to open and shut a communication line between the variable pressure chamber and an operation gas source;
   a passage through which the operation gas from the operation gas source flows;
   a cover which has a diameter approximately equal to the shell, supports said one end of the valve body and is attached to a part of an outer surface of the shell so that an outer surface of the shell and the cover forms a operating gas chamber, in which the operation gas of the passage can be stored;
   wherein said constant pressure chamber communicates with the atmosphere.

2. A booster of the gaseous pressure type comprising:
   a power piston which divides an inner cavity of a shell into a constant pressure chamber which is maintained at an approximately constant pressure and a variable pressure chamber into which an operation gas can be introduced, wherein the power piston comprises a movable partition, which divides the inner cavity of the shell, an outer periphery of which is fixed to an inner periphery of the shell and an inner periphery of which is fixed to a valve body one end of which projects out of the shell and another end of which is directed to the constant pressure chamber;
   a valve which is arranged in the valve body and is operated by an input shaft which is connected to a brake pedal so as to open and shut a communication line between the variable pressure chamber and an operation gas source;
   a passage through which the operation gas from the operation gas source flows;
   a cover which has a diameter approximately equal to the shell, supports said one end of the valve body and is attached to a part of an outer surface of the shell so that an outer surface of the shell and the cover forms an operating gas chamber, in which the operation gas of the passage can be stored;
   wherein the valve body has an approximately cylindrical shape, and the one end of the valve body is directed opposite to the constant pressure chamber and communicates with the atmosphere, the booster of the gaseous pressure type further comprising:
   an output shaft provided in the other end of the valve body;
   said input shaft provided in the one end of the valve body;
   a return spring which urges the valve body and the movable partition toward the input shaft;
   a valve plunger, slidably inserted in a hole which is provided in the valve body, one end of which is directed opposite to the constant pressure chamber, communicates with the atmosphere, and is connected to the input shaft, another end of which is directed to the constant pressure chamber and which receives a reaction of the output shaft, wherein a part which slides in the hole of the valve body is sealed at a side which is directed to the input shaft;
   a first passage, one end of which opens to a space of the valve body through which the valve plunger slides, and another end of which communicates with the operating gas chamber;
   a second passage provided in the plunger and which communicates with the first passage;
   a first valve seat provided in the valve plunger;
   a second valve seat provided on the valve body;
   a valve member which cuts off communication between the variable pressure chamber and the operating gas chamber by seating on the first valve seat and cuts off the communication between the variable pressure chamber and a third passage between the constant pressure chamber and the variable pressure chamber, by seating on the second valve seat;
   a forcing member which urges the valve member so as to contact the first valve seat;
   a return spring for the valve plunger which urges the valve member so as to be spaced from the second valve seat.

3. A booster of the gaseous pressure type according to claim 2, wherein the valve plunger comprises a large diameter portion provided in the input shaft side and a small diameter portion having a predetermined diameter smaller than that of the large diameter portion, these diameter portions being slidably interfitted into a hole of the valve body, and an insertion hole communicating with the operation gas chamber is formed in the valve plunger in a vicinity of a boundary between the large and small diameter portions, the insertion hole being formed perpendicularly to the axis of the valve plunger.

4. A booster of the gaseous pressure type comprising:

a power piston which divides an inner cavity of a shell into a constant pressure chamber which is maintained at an approximately constant pressure and a variable pressure chamber into which an operation gas can be introduced, wherein the power piston comprises a movable partition, which divides the inner cavity of the shell, an outer periphery of which is fixed to an inner periphery of the shell and an inner periphery of which is fixed to a valve body one end of which projects out of the shell and another end of which is directed to the constant pressure chamber;

a valve which is arranged in the valve body and is operated by an input shaft which is connected to a brake pedal so as to open or shut a communication line between the variable pressure chamber and an operation gas source;

a passage through which the operation gas from the operation gas source flows;

a cover which has a diameter approximately equal to the shell, supports said one end of the valve body and is attached to a part of an outer surface of the shell so that an outer surface of the shell and the cover form an operating gas chamber, in which the operation gas of the passage can be stored, the booster of the gaseous pressure type further comprising;

a pressure sensor for detecting the pressure in the operation gas chamber is provided at a determined position in the operation gas chamber or at a predetermined position in the passage from the operation gas source to the operation gas chamber.

5. A booster of the gaseous pressure type comprising:

a power piston which divides an inner cavity of a shell into a constant pressure chamber which is maintained at an approximately constant pressure and a variable pressure chamber into which an operation gas can be introduced, wherein the power piston comprises a movable partition, which divides the inner cavity of the shell, an outer periphery of which is fixed to an inner periphery of the shell and an inner periphery of which is fixed to a valve body one end of which projects out of the shell and another end of which is directed to the constant pressure chamber;

a valve which is arranged in the valve body and is operated by an input shaft which is connected to a brake pedal so as to open and shut a communication line between the variable pressure chamber and an operation gas source;

a passage through which the operation gas from the operation gas source flows;

a cover which has a diameter approximately equal to the shell, supports said one end of the valve body and is attached to a part of an outer surface of the shell so that an outer surface of the shell and the cover forms an operating gas chamber, in which the operation gas of the passage can be stored;

wherein a supply of the operation gas is controlled by a pressure of the operation gas chamber so as to maintain a pressure of the operation gas chamber at an approximately predetermined valve.

6. A booster of the gaseous pressure type comprising:

a power piston which divides an inner cavity of a shell into a constant pressure chamber which is maintained at an approximately constant pressure and a variable pressure chamber into which an operation gas can be introduced, wherein the power piston comprises a movable partition, which divides the inner cavity of the shell, an outer periphery of which is fixed to an inner periphery of the shell and an inner periphery of which is fixed to a value body one end of which projects out of the shell and another end of which is directed to the constant pressure chamber;

a passage through which the operation gas from an operation gas chamber flows;

a cover which has a diameter approximately equal to the shell, supports said one end of the valve body and is attached to a part of an outer surface of the shell so that an outer surface of the shell and the cover forms an operating gas chamber, in which the operation gas of the passage can be stored;

a first valve which is arranged in the valve body and is operated by an input shaft which is connected to a brake pedal so as to open and shut said passage;

wherein the constant pressure chamber is communicated to the intake manifold, and the booster further comprises:

a second valve for introducing air at atmosphere pressure into the variable pressure chamber via movement relative to the valve body, of the input shaft driven by a brake pedal, provided in the valve body; and a switching valve which is opened to supply a compressed operation gas from the operation gas chamber into the variable pressure chamber when the length of the movement of the input shaft relative to the valve body in the output direction is larger than a predetermined valve.

7. A booster of the gaseous pressure type according to claim 6, wherein the switching valve is provided in the middle of a communication line so as to communicate the variable pressure chamber with the operating gas chamber.

8. A booster of the gaseous pressure type according to claim 6, wherein the switching valve is provided in a valve chamber formed such that the switching valve is not concentric with either the input shaft or the output shaft.

9. A booster of the gaseous pressure type according to claim 6, wherein the switching valve is provided coaxially between the input and output shafts, and is provided serially with a flow line of the valve for introducing air.

10. A booster of the gaseous pressure type comprising:

a power piston which divides an inner cavity of a shell into a negative pressure chamber which communicates with a source of negative pressure and a variable pressure chamber into which operation gas can be introduced, wherein the power piston comprises a movable partition, which divides the inner cavity of the shell, an outer periphery of which is fixed to an inner periphery of the shell and an inner periphery of which is fixed to a valve body, one end of which projects out of the shell and another end of which is directed to the negative pressure chamber;

a poppet valve which is arranged in the valve body and is operated by an input shaft, which is connected to a brake pedal, so as to introduce atmospheric pressure into the variable pressure chamber and so as to assist an operation of the input shaft by a differential pressure between the negative pressure chamber and the variable pressure chamber;

wherein the booster further comprises:
- a compressed air source for generating a compressed air;
- a path for communicating the compressed air source and the variable pressure chamber;
- a cover which has a diameter approximately equal to the shell and which supports a projecting part of the valve body and is attached to a part of an outer surface of the shell so as to form an operating gas chamber in which the compressed operation gas of the passage can be stored; and
- a switching valve which cuts off the introduction of the atmospheric pressure into the variable pressure chamber and supplies the compressed air into the variable pressure chamber through the path when the length of the movement of the input shaft relative to the valve body in the output direction is larger than a predetermined value.

11. A booster of gaseous pressure type according to claim 10, wherein the booster further comprises:
- a passage arranged in the valve body for communicating the operating gas chamber with the variable pressure chamber, and said switching valve arranged in the middle of the path.

12. A booster of the gaseous pressure type according to claim 10, wherein the switching valve is provided in the input shaft coaxially with the poppet valve.

13. A booster of the gaseous pressure type according to claim 11, wherein the switching valve is provided in the input shaft coaxially with the poppet valve.

* * * * *

UNITED STATES PATENT AND TRADEMARK OFFICE
CERTIFICATE OF CORRECTION

PATENT NO. : 5,526,729
DATED      : June 18, 1996
INVENTOR(S): Hiromi Ando, Nobumaro Osaka and Yasuhiko Amari It is certified that error appears in the above-indentified patent and that said Letters Patent is hereby corrected as shown below:

Column 21, line 36 "determined" should be --predetermined--.

Column 22, line 2 "valve" should be --value--.

Column 22, line 12 "value" should be --valve--.

Column 22, line 39 "valve" should be --value--.

Signed and Sealed this

Seventeenth Day of September, 1996

Attest:

BRUCE LEHMAN

Attesting Officer

Commissioner of Patents and Trademarks